United States Patent
Llopis

(10) Patent No.: US 9,844,290 B2
(45) Date of Patent: Dec. 19, 2017

(54) METHOD FOR MAKING AND DISPENSING COFFEE-BASED BEVERAGES

(71) Applicant: SANREMO COFFEE MACHINES SRL, Carbonera, Frazione Vascon (IT)

(72) Inventor: Francesco Daniele Llopis, Cecima (IT)

(73) Assignee: SANREMO COFFEE MACHINES SRL, Franzione Vascon (IT)

( * ) Notice: Subject to any disclaimer, the term of this patent is extended or adjusted under 35 U.S.C. 154(b) by 0 days.

(21) Appl. No.: 15/030,333

(22) PCT Filed: Aug. 26, 2014

(86) PCT No.: PCT/EP2014/068102
§ 371 (c)(1),
(2) Date: Apr. 18, 2016

(87) PCT Pub. No.: WO2015/055342
PCT Pub. Date: Apr. 23, 2015

(65) Prior Publication Data
US 2016/0249763 A1 Sep. 1, 2016

(30) Foreign Application Priority Data
Oct. 18, 2013 (IT) .............................. TV13A000172

(51) Int. Cl.
*A47J 31/40* (2006.01)
*A47J 31/36* (2006.01)
(Continued)

(52) U.S. Cl.
CPC ............. *A47J 31/404* (2013.01); *A23F 5/262* (2013.01); *A47J 31/002* (2013.01); *A47J 31/36* (2013.01); *A47J 31/3671* (2013.01)

(58) Field of Classification Search
CPC ........ A47J 31/002; A47J 31/36; A47J 31/404; A47J 31/3671
See application file for complete search history.

(56) References Cited

U.S. PATENT DOCUMENTS

| 4,484,515 A | * | 11/1984 | Illy ..................... A47J 31/3647 222/54 |
| 2013/0129885 A1 | * | 5/2013 | Doglioni Majer .... A47J 31/002 426/431 |

FOREIGN PATENT DOCUMENTS

| WO | 2010076264 A1 | 7/2010 |
| WO | 2010125329 A1 | 11/2010 |
| WO | 2011151703 A2 | 12/2011 |

OTHER PUBLICATIONS

International Search Report issued Feb. 11, 2015 re: Application No. PCT/EP2014/068102;pp. 1-3; citing: WO 2011/151703 A2, EP 2 384 134 B1 and WO 2010/125329 A1.
(Continued)

*Primary Examiner* — Anthony Weier
(74) *Attorney, Agent, or Firm* — Cantor Colburn LLP

(57) ABSTRACT

A method for making and dispensing coffee-based beverages in machines includes increasing the water temperature inside a boiler and assembly to achieve preheating with to adjust the delivered thermal power. The method includes three dispensing steps. Preheated water at a selected temperature achieves a pre-infusion in a preset time or water volume without pressure in the hydraulic pump, wherein the coffee powder is only wet. Next, the coffee powder is infused by means of the use of a logic unit that manages the volume of dispensed water by a volumetric meter and at a preset, constant pressure as a function of the ground coffee and dispensed product weight. An amount by volume of water is dispensed and calculated to achieve a selected and preset brew ratio. Finally, post-infusion is achieved in which the hydraulic pump is deactivated for a time needed to reach by weight the programmed dose of dispensed product.

11 Claims, 2 Drawing Sheets

(51) Int. Cl.
*A47J 31/00* (2006.01)
*A23F 5/26* (2006.01)

(56) References Cited

OTHER PUBLICATIONS

Written Opinion issued Feb. 11, 2015 re: Application No. PCT/EP2014/068102; pp. 1-4; citing: WO 2011/151703 A2.

* cited by examiner

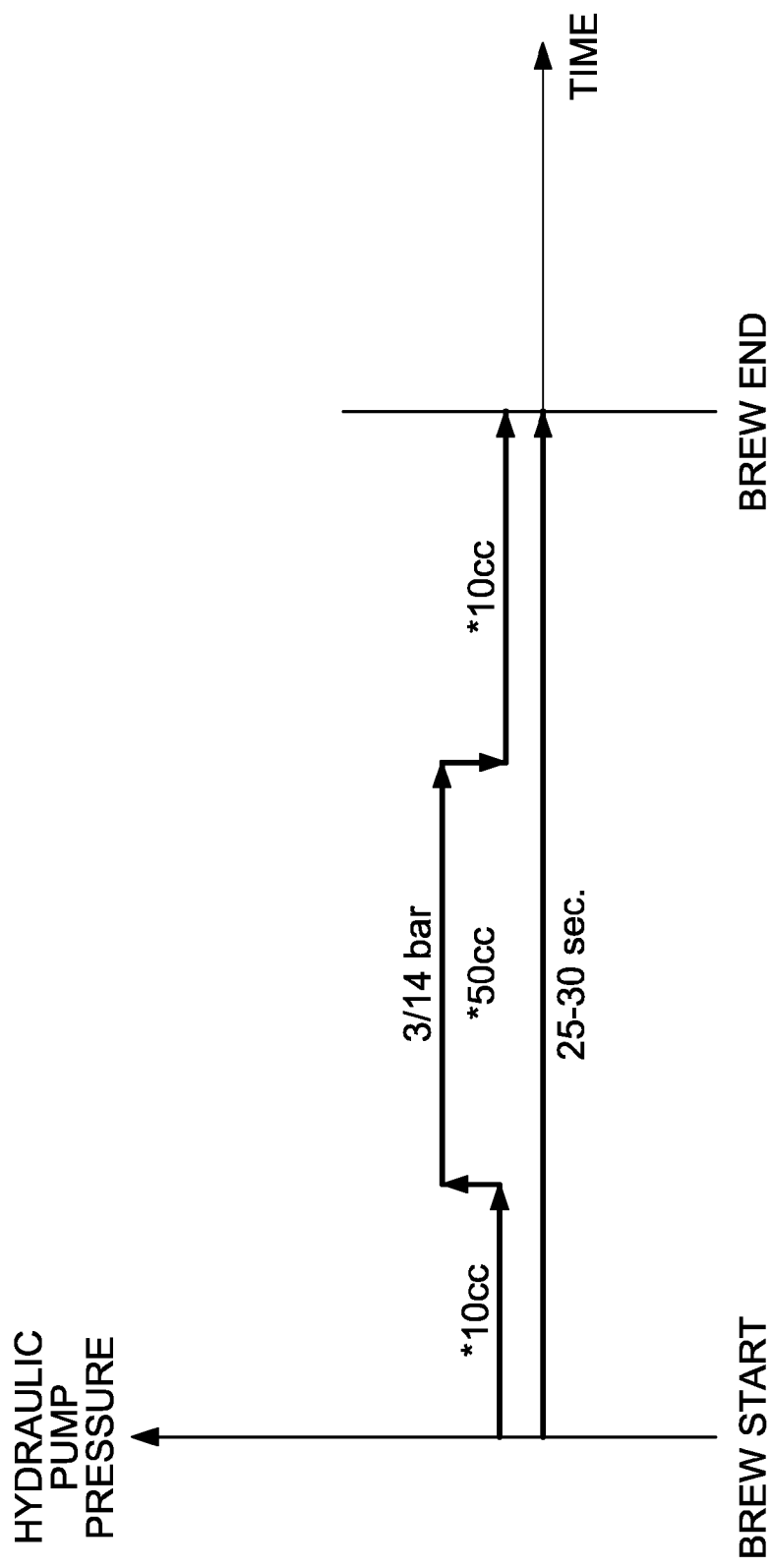

METHOD FOR MAKING AND DISPENSING COFFEE-BASED BEVERAGES

TECHNICAL FIELD

The present disclosure relates to a method for making and dispensing coffee-based beverages.

BACKGROUND

Machines for making and dispensing coffee-based beverages, particularly for the professional sector, such as bars, restaurants, hotels and catering, are currently known.

They comprise substantially a grinder for coffee beans, a boiler, a pump, an assembly for dispensing hot water with which it is possible to associate in a downward region a filter in which the ground coffee is placed and pressed.

Therefore, once the coffee has been ground, it is pressed in the filter basket holder, which in turn is coupled to the dispensing assembly, and then the pump that dispenses the hot water is activated, thus obtaining the infusion.

The resulting coffee can vary in its organoleptic characteristics as a function, for example, of the amount of ground coffee used, of the degree of grinding, of the extent of the pressure used, of the time in which the water is dispensed.

Italian patents no. 1396581 and no. 1396582, both filed on 23 Oct. 2009, relate to a method for controlling the dispensing pressure in a coffee machine in order to produce and dispense coffee-based beverages; patent no. 1396581 comprises a filter unit that is adapted to contain coffee powder, the method comprising:

supplying a preset quantity of water from a hydraulic pump with a flow-rate that corresponds to at least one nominal dispensing pressure value to a hydraulic circuit that has a fluid connection to the hydraulic pump and to the dispensing assembly, the hydraulic pump being actuatable by means of an electronic control device;

detecting at least one water dispensing pressure value by means of a pressure sensor arranged along the hydraulic circuit, and if the at least one detected value of the dispensing pressure differs from the at least one nominal pressure value, adjusting the flow-rate of the water dispensed by the pump as a function of the at least one detected dispensing pressure value.

Italian Patent no. 1396582 differs in that it includes at least one dispenser which comprises a filter unit adapted to contain coffee powder, the method comprising:

supplying water to a hydraulic circuit that has fluid connection to the at least one dispenser and comprises a valve with adjustable flow-rate adapted to emit variable quantities of water to the at least one dispenser;

emitting from the adjustable flow-rate valve a preset quantity of water that corresponds to at least one nominal dispensing pressure value, the valve with adjustable flow-rate being actuatable by means of an electronic control device that controls the flow-rate of water in output from the valve;

detecting at least one water dispensing pressure value by means of a pressure sensor arranged along the hydraulic circuit, and if the at least one detected value of the dispensing pressure differs from the at least one nominal pressure value, adjusting the flow-rate of the water emitted by the adjustable flow-rate valve as a function of the at least one detected pressure value.

These solutions are based specifically on control and adjustment of the dispensing pressure.

However, this method suffers the drawback of requiring continuous control and modification of the pressure and a structural complexity that entails the use of expensive components, all this increasing the overall cost of the machine.

Moreover, it is not possible to keep the result in the cup constant because it is subject to a continuously variable choice on the pressure that can be made by the operator.

Patent Application no. WO2012146641 relates to a weighing device for an espresso coffee machine, the device comprising a weighing platform that can be located in the tray region of the espresso coffee machine below a dispensing assembly, a controller connected to the weighing platform, a start/stop button, a timer unit and a display, all of which are connected to a control unit, such that, during the use, the weight of a dispensing and the time required to dispense it are measured by means of the weighing platform and the timer unit, respectively, and the results are shown on a display.

This solution, too, suffers drawbacks, since it is considered insufficient to weigh the ground coffee and determine the water dispensing time in order to obtain an optimum infusion, and moreover the operator must in any case decide, on the basis of the indications that are present on the display, when to interrupt the dispensing of the water.

Moreover, it is still not possible to keep constant the result in the cup.

SUMMARY

The aim of the present disclosure is therefore to solve the described technical problems, by eliminating the drawbacks of the cited background art and by devising a method for dispensing a coffee-based beverage that allows to obtain an optimum infusion and allows the infusion to be repeatable over time as well as straightforward and easy to obtain by the operator.

Within this aim, the disclosure provides a method that allows to dispense an infusion that has constant organoleptic characteristics over time.

The disclosure further provides a method that allows to keep constant the result in the cup once a specific parameter has been determined by the user.

This aim and others that will become better apparent hereinafter are achieved by a method for making and dispensing coffee-based beverages in machines comprising a preheating boiler with temperature control, a hydraulic pump, a dispensing assembly provided with systems for further heating and temperature control of the water, and manual or electronic means for controlling both the thermal power delivered within said preheating boiler and the thermal power delivered by said dispensing assembly, as well as means adapted to weigh the ground coffee in a filter basket holder and the weight of the dispensed product in a cup, said method being characterized in that it comprises the following steps:

increasing the temperature of the water, inside said heating boiler and inside said dispensing assembly, in order to achieve a preheating thereof with reading of the associated temperature in order to adjust the delivered thermal power;

a first dispensing step of preheated water at a selected temperature in order to achieve a pre-infusion in a preset time or for a preset volume of water in the absence of pressure in said hydraulic pump, wherein the coffee powder is only wet;

a second dispensing step in order to achieve an infusion of the coffee powder into which, by means of the use of a logic unit that manages the volume of dispensed water by means of a volumetric meter and at a preset and constant pressure as a function of the weight of the ground coffee and of the dispensed product, an amount by volume of water is dispensed which is calculated to achieve a selected and preset brew ratio;

a third dispensing step to achieve a post-infusion in which said hydraulic pump is deactivated again for a time needed to reach by weight the programmed dose of dispensed product.

BRIEF DESCRIPTION OF THE DRAWINGS

Further characteristics and advantages of the disclosure will become better apparent from the detailed description of a particular but not exclusive embodiment, illustrated by way of non-limiting example in the accompanying drawings, wherein:

FIG. 2 is a pressure chart.

Figure 1:
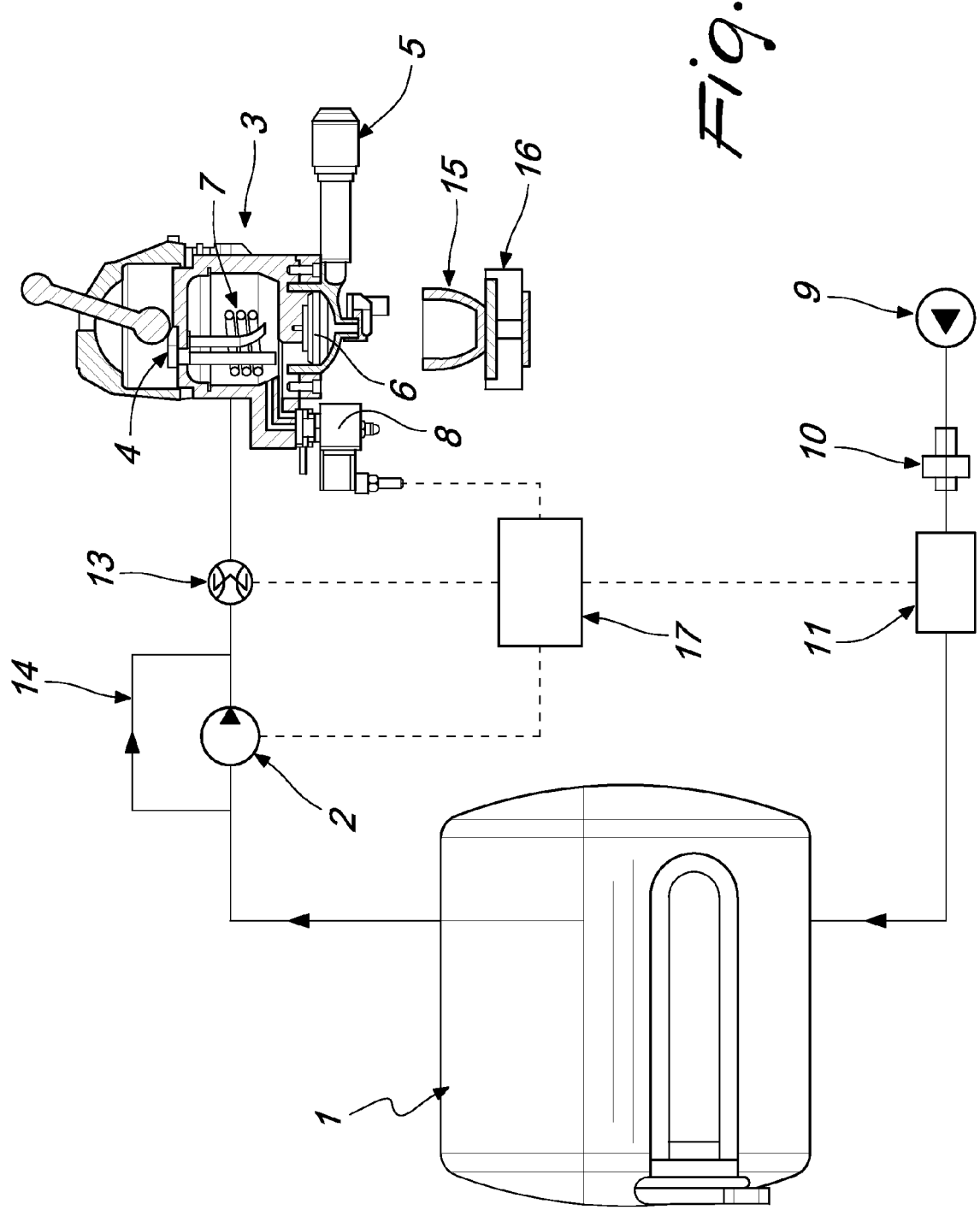
FIG. 1 is a diagram of the components used.

In the exemplary embodiments that follow, individual characteristics, given in relation to specific examples, may actually be interchanged with other different characteristics that exist in other exemplary embodiments.

DETAILED DESCRIPTION OF THE DRAWINGS

With reference to the figures, a method is described for making and dispensing coffee-based beverages in machines comprising a preheating boiler 1 with temperature control, a hydraulic pump 2, a dispensing assembly 3 provided with means 4, such as a sensor, for temperature control, a filter basket holder 5 provided with a filter 6 on which ground coffee is pressed, a resistance heater 7, and an electric valve 8.

The hydraulic pump 2 ensures the dispensing of a constant pressure during all the various water dispensing steps, said dispensing being programmable (for example up to 14 bar) according to a quantity required to dispense a cup of espresso coffee in a set time.

Advantageously, the preheating boiler 1 is fed by means of the water mains 9 with the interposition of a filter 10 and of a block 11 that is intended to distribute the mains water in the two coffee/steam water circuits.

Moreover, the boiler 1 is interconnected to the dispensing assembly 3 by means of the interposition of a volumetric meter 13, while the hydraulic pump 2 can be bypassed by means of a duct 14 that connects the boiler 1 directly to the dispensing assembly 3.

There are also provided manual or electronic means for controlling both the thermal power dispensed within the preheating boiler 1 and the thermal power dispensed by the dispensing assembly 3, and means adapted to weigh the ground coffee in the filter basket holder 5, and the weight of the product dispensed in a cup 15, such as a balance 16.

There is, furthermore, a centralized logic unit 17 that is connected to the hydraulic pump 2, to the volumetric meter 13, to the block 11 and to the electric valve 8.

The method provides initially for an increase in the temperature of the water, inside the preheating boiler 1 and inside the dispensing assembly 3, in order to achieve a preheating of the water with reading of the associated temperature, by means of the sensor 4, in order to adjust the delivered thermal power; this allows to enhance the aromas of the ground coffee in the filter basket holder 5.

This is followed by a first dispensing of preheated water in order to achieve a pre-infusion in a preset time or for a preset volume of water in the absence of pressure in the hydraulic pump 2, wherein the coffee powder, contained in the filter basket holder 5, is only wet.

This pre-infusion allows to improve the brewing of the coffee.

Upon dispensing, the ground coffee is imbibed with preheated water without pressure of the hydraulic pump 2 for a few seconds.

This allows to increase the volume of the ground coffee and to improve the flow of subsequent water under pressure without creating preferential pathways.

This is followed by a second dispensing step in order to achieve an infusion of the coffee powder contained in the filter basket holder 5, into which, by means of the use of the centralized logic unit 17 that manages the volume of dispensed water by means of the volumetric meter 13 and at a preset and constant pressure as a function of the weight of the ground coffee and of the dispensed product, an amount by volume of water is dispensed which is calculated to achieve a selected and preset brew ratio.

This brew ratio can be outlined according to the following table:

| Ground coffee weight Powder in grams | Weight of dispensed product Liquid in grams | 40% brew ratio Volume of hot water in cc | 50% brew ratio Volume of hot water in cc | 60% brew ratio Volume of hot water in cc |
|---|---|---|---|---|
| 14 | 28 | 63.3 | 50.6 | 42.2 |
| 15 | 30 | 67.9 | 54.3 | 45.3 |
| 16 | 32 | 72.5 | 58.0 | 48.3 |
| 17 | 34 | 77.1 | 61.7 | 51.4 |
| 18 | 36 | 81.8 | 65.4 | 54.5 |
| 19 | 38 | 86.4 | 69.1 | 57.6 |
| 20 | 40 | 91.0 | 72.8 | 60.7 |
| 21 | 42 | 95.6 | 76.5 | 63.8 |

A third dispensing step follows to achieve a post-infusion in which the hydraulic pump 2 is deactivated again for a time needed to reach by weight the programmed dose of dispensed product.

Water dispensing by means of the hydraulic pump 2 always occurs at a constant pressure according to the following chart, shown calculating for example a hypothetical dose of 70 cc:

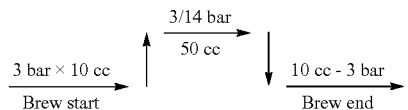

The method allows, by controlling the quantity by volume of water calculated to achieve a desired brew ratio, to enhance the extraction of the aromas and all the organoleptic qualities during the dispensing of the espresso coffee, once the weight of the coffee in the cup 15 has been measured with respect to the weight of the coffee powder contained in the filter basket holder 5.

The ground coffee, previously imbibed with water heated to the optimum temperature without pressure of the hydraulic pump 2 for a few seconds, is then struck by the hot water under pressure at a preset constant value: this allows to increase the extraction of water-soluble substances present in the coffee and to make them remain for a shorter time at high temperatures, which, as in the case of protein, would cause their denaturation, with consequent loss of their structure, which is essential in the formation of cream.

In the second dispensing or infusion step, water at constant temperature and pressure passes through the layer of coffee powder contained in the filter basket holder 5; an emulsion of the oils extracted in the preceding step is obtained, by means of which the beverage assumes the creamy appearance that distinguishes it, so as to enhance its body and acidity.

In the third dispensing step, the hydraulic pump 2 is disengaged and extraction continues for a programmed time or dose in cc; the bitter notes are enhanced in this step.

As regards control of the quantity by volume of water calculated to obtain a desired brew ratio, it is obtained by measuring the weight of the coffee, which must have a correct grinding and a pressing level equal to approximately 22 kg, arranged in the filter basket holder 5, and the weight of the dispensed product; in order to achieve this, there is the balance 16, which is arranged below the dispensing assembly 3 and communicates with the centralized logic unit 17; by reading the data sent by the balance 16, the desired brew ratio is established; for example, with 15 g of powdered coffee and 30 g of espresso coffee dispensed, the volume of water needed to have a brew ratio equal to 40% is equal to 67.9 cc of hot water on the coffee, while at 50% it is equal to 54.3 cc and at 60% it is equal to 45.3 cc.

By means of the centralized logic unit or CPU 17 it is possible to manage the volume of water dispensed with the control of the volumetric meter 13; a software is used that comprises a data table such as the one shown previously and these data can also be changed during programming by the user in order to improve and personalize the brew ratio.

It has thus been found that the disclosure provides a method which achieves optimum infusion, which is repeatable over time and straightforward to obtain on the part of the operator, and also has organoleptic characteristics that are constant over time.

When the parameters of the brew ratio are set, the result in the cup is in fact constant for each dispensing.

Moreover, this method allows to check the result in the cup directly for example by reading the brew ratio shown on an adapted display located for example in front of the operator and allows to manage the best extraction by means of a series of parameters that are already set as default in the software and allow to have perfect and constant extractions of espresso coffee.

This is possible also thanks to the use of the balance or load cell 16 arranged below the dispensing assembly 3, which communicates with the centralized logic unit or CPU 17 and allows to manage different yield percentages with the same quantity of ground coffee placed in the filter basket holder 5.

Obviously, the materials used, as well as the dimensions that constitute the individual components of the disclosure, may be more pertinent according to specific requirements.

The characteristics indicated as advantageous, convenient or the like may also be omitted or be replaced with equivalents.

The disclosures in Italian Patent Application No. TV2013A000172 from which this application claims priority are incorporated herein by reference.

The invention claimed is:

1. A method for making and dispensing coffee-based beverages in machines having a preheating boiler with temperature control, a hydraulic pump, a dispensing assembly, and means for controlling both the thermal power delivered within said preheating boiler and the thermal power delivered by said dispensing assembly, and means adapted to weigh the ground coffee in a filter basket holder and the weight of the dispensed product in a cup, the method including the following steps:

increasing the temperature inside said heating boiler and inside said dispensing assembly, in order to achieve a preheating thereof with reading of the associated temperature in order to adjust the delivered thermal power, a first dispensing step of preheated water at a selected temperature in order to achieve a pre-infusion in a preset time or for a preset volume of water in the absence of pressure in said hydraulic pump, wherein the coffee powder is only wet, a second dispensing step in order to achieve an infusion of the coffee powder into which, by means of the use of a logic unit that manages the volume of dispensed water by means of a volumetric meter and at a preset and constant pressure as a function of the weight of the ground coffee and of the dispensed product, an amount by volume of water is dispensed which is calculated to achieve a selected and preset brew ratio wherein the brew ratio is the ratio of infusion water to ground coffee, and a third dispensing step to achieve a post-infusion wherein the pressure is reduced for a time needed to reach by weight a programmed dose of dispensed product.

2. The method according to claim 1, wherein said second dispensing step occurs for a quantity by volume of water that is calculated to achieve a brew ratio according to the following table:

| Ground coffee weight Powder in grams | Weight of dispensed product Liquid in grams | 40% brew ratio Volume of hot water in cc | 50% brew ratio Volume of hot water in cc | 60% brew ratio Volume of hot water in cc |
|---|---|---|---|---|
| 14 | 28 | 63.3 | 50.6 | 42.2 |
| 15 | 30 | 67.9 | 54.3 | 45.3 |
| 16 | 32 | 72.5 | 58.0 | 48.3 |
| 17 | 34 | 77.1 | 61.7 | 51.4 |
| 18 | 36 | 81.8 | 65.4 | 54.5 |
| 19 | 38 | 86.4 | 69.1 | 57.6 |
| 20 | 40 | 91.0 | 72.8 | 60.7 |
| 21 | 42 | 95.6 | 76.5 | 63.8. |

3. The method according to claim 1, wherein the temperature of the water is raised, within said preheating boiler and within said dispensing assembly, to achieve a preheating of said water to a chosen temperature, with reading of the corresponding temperature by means of a sensor in order to adjust the delivered thermal power.

4. The method according to claim 1, including the first dispensing of preheated water to achieve a pre-infusion, in a preset time or for a preset volume of water in the absence of pressure in said hydraulic pump, wherein the coffee powder contained in said filter basket holder is only wet in order to increase the volume of the ground coffee and improve the flow of subsequent water under pressure without creating preferential paths.

5. The method according to claim 1, including the second dispensing step in order to achieve an infusion of the coffee powder, contained in a filter basket holder, in which, by using a centralized logic unit which manages the volume of water dispensed by means of a volumetric meter and at a preset and constant pressure as a function of the weight of the ground coffee and of the dispensed product, a quantity by volume of water that is calculated to achieve a selected brew ratio is dispensed.

6. The method according to claim 1, wherein the dispensing of the water by means of said hydraulic pump occurring always at a pressure according to the following chart of the first dispensing step, the second dispensing step, and the third dispensing step, shown by calculating a dose of 70 cc:

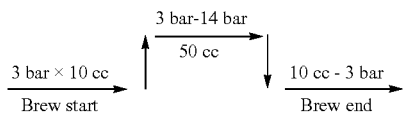

and the third dispensing step achieves a post-infusion in which said hydraulic pump is deactivated for a time needed to reach by weight the programmed dose of product dispensed.

7. The method according to claim 1, wherein in the second step, said ground coffee is struck by the water under pressure at a constant preset value to increase the brewing of water-soluble substances in the coffee and to make them remain for a shorter time at high temperatures.

8. The method according to claim 1, wherein in the second step of dispensing, water at constant temperature and pressure passes through the layer of coffee powder contained in said filter basket holder to achieve an emulsion of the oils extracted in the preceding step.

9. The method according to claim 1, wherein in the third dispensing step said hydraulic pump is disengaged and brewing continues for the programmed time or dose in cc.

10. The method according to claim 5, wherein control occurs of the quantity by volume of water calculated to achieve a selected brew ratio obtained by measuring the weight of the coffee, ground and pressed, and the weight of the dispensed product, by means of a balance that is arranged below said dispensing assembly and is connected to said centralized logic unit, the reading of the data sent by said balance establishing the desired brew ratio, said centralized logic unit or CPU allowing management of the volume of water dispensed with the control of said volumetric meter using a software that includes a data table, said data being modifiable during programming by the user to improve and customize the brew ratio.

11. The method according to claim 1, wherein with 15 g of coffee powder and 30 g of espresso coffee dispensed, the volume of water needed to have a brew ratio equal to 40% is equal to 67.9 cc of hot water on the coffee, while at 50% it is equal to 54.3 cc and at 60% it is equal to 45.3 cc.

* * * * *